United States Patent
Wang et al.

(10) Patent No.: US 9,594,269 B2
(45) Date of Patent: Mar. 14, 2017

(54) LIFT DEVICE AND LIFT SYSTEM FOR SUBSTRATE LOADING PLATFORM

(71) Applicant: SHENZHEN CHINA STAR OPTOELECTRONICS TECHNOLOGY CO., LTD, Guangdong (CN)

(72) Inventors: Jiang Wang, Guangdong (CN); Pei Lin, Guangdong (CN); Yan Ze Li, Guangdong (CN); Kailang Liu, Guangdong (CN); Yipeng Ding, Guangdong (CN); Jinghua Chen, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 187 days.

(21) Appl. No.: 14/408,848

(22) PCT Filed: Sep. 29, 2014

(86) PCT No.: PCT/CN2014/087771
§ 371 (c)(1),
(2) Date: Dec. 17, 2014

(87) PCT Pub. No.: WO2016/045136
PCT Pub. Date: Mar. 31, 2016

(65) Prior Publication Data
US 2016/0274385 A1 Sep. 22, 2016

(30) Foreign Application Priority Data
Sep. 23, 2014 (CN) .......................... 2014 1 0488332

(51) Int. Cl.
*B25J 15/00* (2006.01)
*G02F 1/13* (2006.01)

(52) U.S. Cl.
CPC ........ *G02F 1/1303* (2013.01); *B25J 15/0014* (2013.01)

(58) Field of Classification Search
CPC .................................. B25J 15/00; G02F 1/13
(Continued)

(56) References Cited

U.S. PATENT DOCUMENTS

2002/0008864 A1 1/2002 Kondo
2002/0094600 A1* 7/2002 Aburatani ........... C23C 16/4584
438/100
(Continued)

FOREIGN PATENT DOCUMENTS

CN 1974355 A 6/2007
CN 201924076 U 8/2011
(Continued)

OTHER PUBLICATIONS

International Search Report issued in corresponding International Application No. PCT/CN2014/087771 dated May 27, 2015 (6 pages).

*Primary Examiner* — Paul T Chin
(74) *Attorney, Agent, or Firm* — Osha Liang LLP

(57) ABSTRACT

A lift device and a lift system are provided, which comprises: a carrying mechanism including a guiding hole; a lift pin passing through inside the guiding hole; a carrying base, which is connected to the lift pin, wherein when the carrying base is moved upward, the lift pin is moved upward and inside the guiding hole; and a magnetic control device, which is used to send a magnetic control signal, so as to move the lift pin downward. By the lift pin being moved
(Continued)

downward and magnetically sucked, a bad process problem and a break risk can be avoided.

11 Claims, 2 Drawing Sheets

(58) Field of Classification Search
USPC ...... 294/213, 81.5, 81.52; 414/744.3, 745.2; 355/42
See application file for complete search history.

(56) References Cited

U.S. PATENT DOCUMENTS

| | | | |
|---|---|---|---|
| 2004/0055707 A1* | 3/2004 | Sato | B08B 17/00 156/345.11 |
| 2008/0108154 A1* | 5/2008 | Son | H01L 21/6831 438/17 |
| 2011/0056514 A1* | 3/2011 | Lee | H01J 37/321 134/1.1 |
| 2013/0258300 A1* | 10/2013 | Nishiyama | B08B 3/04 355/30 |

FOREIGN PATENT DOCUMENTS

| | | |
|---|---|---|
| CN | 102460650 A | 5/2012 |
| JP | 2003045944 A | 2/2003 |
| JP | 2013142186 A | 7/2013 |

* cited by examiner

LIFT DEVICE AND LIFT SYSTEM FOR SUBSTRATE LOADING PLATFORM

FIELD OF THE INVENTION

The present invention relates to a technological field of manufacturing liquid crystal display panels, and more particularly to a lift device and a lift system for a substrate loading platform.

BACKGROUND OF THE INVENTION

In the TFT-LCD (Thin Film Transistor-Liquid Crystal Display) manufacturing industry, with the size of the glass substrates becoming larger, the requirements for the effects of a film formation in the panel manufacturing process have increased.

Meanwhile, in a production line of an automatic integral equipment, with the marketing requirements of panels becoming larger and the material of the glass substrates becoming thinner, the amount of bending of the glass substrates in the manufacturing equipment has increased, wherein the amount of bending is a droop degree of the glass substrates when it is in the manufacturing equipment. When in a photo process (which comprises a photoresist coater unit, a soft bake unit, and a hard bake unit), a glass substrate has to be supported by lift pins, and each of the lift pins ascends and descends in a guiding hole of a glass substrate carrying mechanism, so as to evenly coat the photoresist on the glass substrate, and then the photoresist is baked and dried.

However, when in operation, it has been found that because the manufacturing process is long-term, the lift pins are slightly bent after supporting quite a lot of weight. Therefore, the bent lift pins are easily rubbed against the inside of the guiding hole of a glass substrate carrying mechanism, so that in the manufacturing process, since the lift pins are rubbed against the inside of the guiding hole, and the glass substrate cannot descend to an original position, a bad process or a breaking risk for the glass substrates will occur.

SUMMARY OF THE INVENTION

One of the objects of the present invention is to provide a lift device and a lift system, by which the lift pin is moved downward and magnetically sucked, thereby to ensure that a lift pin and a carrying base are descended to an original position, so as to avoid a bad processing problem and a break risk.

For solving the above-mentioned problem, the present invention provides a technical feature as follows:

a lift device, which comprises:
a carrying mechanism including a guiding hole;
a lift pin passing through inside the guiding hole;
a carrying base, wherein the carrying base including a fixing nut, wherein a lower end of the lift pin is formed as a bolt; and the carrying base is connected and fixed to the lower end of the lift pin, wherein when the carrying base is moved upward under an external force, the lift pin is moved upward and inside the guiding hole; and
a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal;

wherein the carrying mechanism further includes a support element, which is arranged on a periphery of the guiding hole, wherein the support element is used to fix the carrying mechanism below a substrate loading platform, and the substrate loading platform is used to support a glass substrate.

In the above-mentioned lift device, the fixing nut has a position element, which is arranged on a periphery of the fixing nut to limit a maximum ascending movement distance of the lift pin.

In the above-mentioned lift device, the materials of the carrying base, the fixing nut, and the position element are all metals.

For solving the above-mentioned technological problem, the present invention further provides a technical feature as follows:

a lift device, which comprises:
a carrying mechanism including a guiding hole;
a lift pin passing through inside the guiding hole;
a carrying base which is connected and fixed to a lower end of the lift pin, wherein when the carrying base is moved upward under an external force, the lift pin is moved upward and inside the guiding hole; and
a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal.

In the above-mentioned lift device, the carrying mechanism further includes a support element, which is arranged on a periphery of the guiding hole, wherein the support element is used to fix the carrying mechanism below a substrate loading platform, and the substrate loading platform is used to support a glass substrate.

In the above-mentioned lift device, the carrying base includes a fixing nut, and the lower end of the lift pins is formed as a bolt.

In the above-mentioned lift device, the fixing nut has a position element, which is arranged on a periphery of the fixing nut to limit a maximum ascending movement distance of the lift pin.

In the above-mentioned lift device, the materials of the carrying base, the fixing nut, and the position element are all metals.

For solving the above-mentioned technological problem, the present invention further provides a technical feature as follows:

a lift system, which comprises: a substrate loading platform and at least one lift device;
wherein the substrate loading platform is used to support a glass substrate;
the lift device is fixed below the substrate loading platform; and
wherein the lift device comprises:
a carrying mechanism including a guiding hole;
a lift pin passing through inside the guiding hole;
a carrying base, which is connected and fixed to a lower end of the lift pin, wherein when the carrying base is moved upward under an external force, the lift pin is moved upward and inside the guiding hole; and
a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal.

In the above-mentioned lift system, the carrying mechanism further includes a support element, which is arranged on a periphery of the guiding hole, wherein the support element is used to fix the carrying mechanism below a substrate loading platform, and the substrate loading platform is used to support a glass substrate.

In the above-mentioned lift system, the carrying base includes a fixing nut, and the lower end of the lift pins is formed as a bolt.

In the above-mentioned lift system, the fixing nut has a position element which is arranged on a periphery of the fixing nut to limit a maximum ascending movement distance of the lift pin.

In the above-mentioned lift system, the materials of the carrying base, the fixing nut, and the position element are all metals.

Compare with the conventional technologies, in the lift device and the lift system according to the present invention, when the lift pin is going to descend, by the magnetic control device sending the magnetic control signal, the lift pin and the carrying base are magnetically sucked, and the descending method of the lift pin and the carrying base is a traction force of the gravitational force and the magnetic force, so as to ensure that the lift pin and the carrying base descend to an original position, thereby avoiding a bad process such as an uneven brightness problem of a display or a break happening.

DETAILED DESCRIPTION OF THE PREFERRED EMBODIMENTS

Please refer to the drawings, wherein the same symbols representing like components are used to represent the principles of the present invention implemented in a suitable computing environment as examples. The following description is based on the specific illustrated embodiment of the present invention, which should not be construed as limiting the unillustrated embodiment of the present invention.

Figure 1:
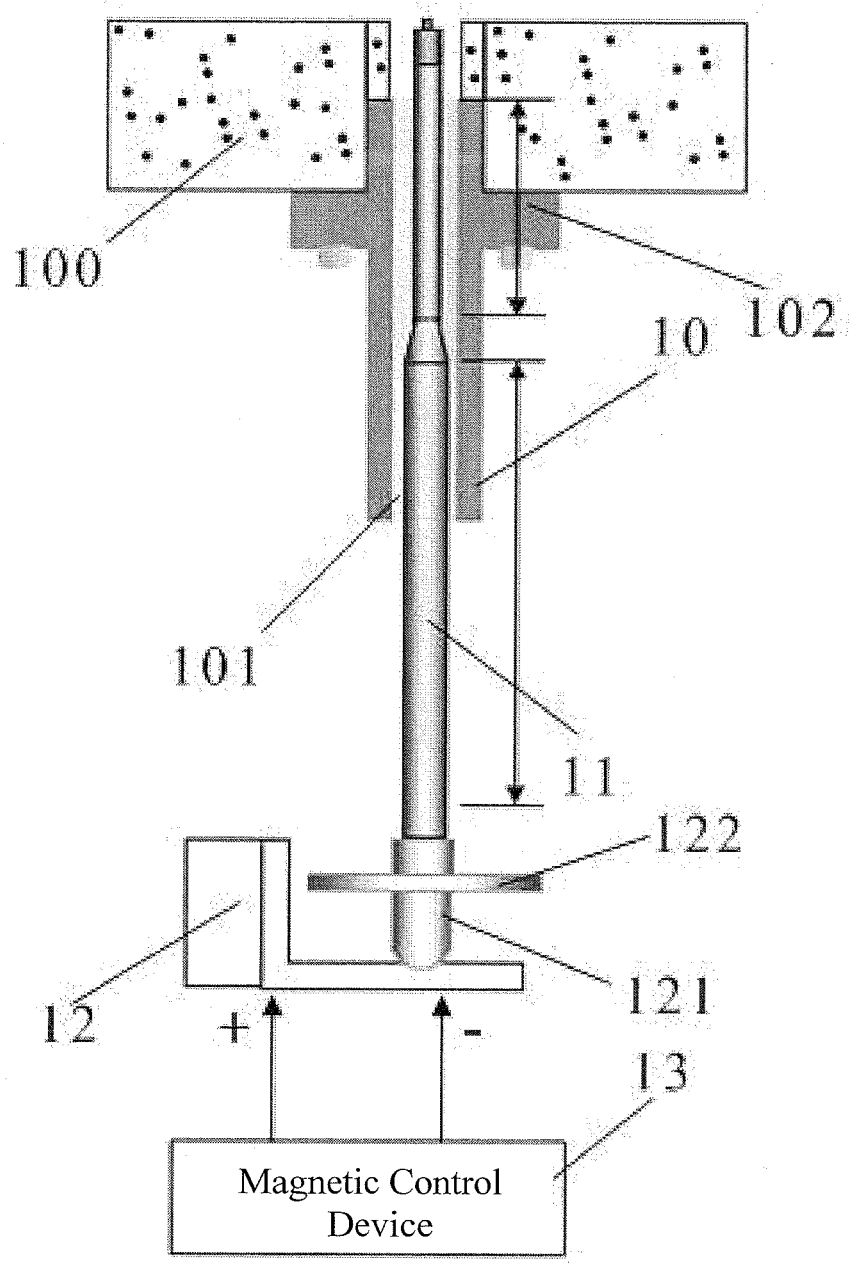
FIG. 1 is a structural schematic view of a lift device according to a preferred embodiment of the present invention.

Refer now to FIG. 1, which is a structural schematic view of a lift device according to a preferred embodiment of the present invention. The lift device comprises:

a carrying mechanism 10, which includes a guiding hole 101;

a lift pin 11, which passes through inside the guiding hole 101;

a carrying base 12, which is connected and fixed to a lower end of the lift pin 11, wherein when the carrying base 12 is moved upward under an external force, the lift pin 11 is moved upward and inside the guiding hole 101; and a magnetic control device 13, which is connected to the carrying base 12 through a magnetic force line, wherein the magnetic control device 13 is used to send a magnetic control signal to the carrying base 12 through the magnetic force line, so as to move the lift pin 11 downward and inside the guiding hole 101 under the control of the magnetic control signal.

However, as shown in FIG. 1, the upper half of the lift pin 11 is thinner than the lower half thereof. When the lift pin 11 supports a glass substrate, the lift pin 11 is slightly bent because of supporting quite a lot of weight, so that the lower half of the lift pin 11 is rubbed against the inside of the guiding hole 101 when moving upward/downward and inside the guiding hole 101.

In the present invention, by the carrying base 12 being connected to the magnetic control device 13 and the magnetic control device 13 sending a magnetic control signal to the carrying base 12, the lift pin 11 is moved downward and inside the guiding hole 101 under the control of the magnetic control signal. That is, the descending method of the lift pin 11 and the carrying base 12 is changed from a gravitational force to a traction force of the gravitational force and the magnetic force. When the lift pin 11 is going to ascend, the magnetic control signal is not sent, and the lift pin 11 is moved upward by the external force applied to the carrying base 12; and when the lift pin 11 is going to descend, by a drive of the magnetic control signal, the magnetic force sucks the carrying base 12, and drives the lift pin 11 moved downward. The magnetic control signal of the magnetic control device 13 can be controlled to be generated and sent by software, they are not described here.

As mentioned above, in the lift device according to the preferred embodiment of the present invention, when the lift pin 11 is going to descend, by the magnetic control device sends the magnetic control signal, the lift pin 11 and the carrying base 12 are magnetically sucked, and the descending method of the lift pin 11 and the carrying base 12 is a traction force of the gravitational force and the magnetic force, so as to ensure that the lift pin 11 and the carrying base 12 descend to an original position (as shown in FIG. 1, the lift pin 11 is at the original position), so that it can avoid a bad process such as an uneven brightness problem of a display or a break happening.

Additionally, the carrying mechanism 10 is provided with a support element 102, which is arranged on a periphery of the guiding hole 101, wherein the support element 102 is used to fix the carrying mechanism 10 below a substrate loading platform 100. The substrate loading platform 100 is used to support a glass substrate (not shown in the figure).

It can be understood that the substrate loading platform 100 is provided with a plurality of through holes, wherein each of the through holes is corresponding to a guiding holes 101 of a carrying mechanism 10 below the substrate loading platform 100. Since the glass substrate is loaded on the substrate loading platform 100, when a plurality of the lift pins 11 are simultaneously ascended or descended, and pass through the through holes, the glass substrate thereabove is driven to be ascended or descended.

Furthermore, as shown in FIG. 1, the carrying base 12 includes a fixing nut 121, and the lower end of the lift pins 11 is formed as a bolt. That is, the carrying base 12 and he lift pins 11 are fixed by a matching method of screw nut/bolt.

Preferably, the fixing nut 121 has a position element 122 which is arranged on a periphery of the fixing nut 121 to limit a maximum ascending movement distance of the lift pin 11. Preferably, in the preferred embodiment of the present invention, the materials of the carrying base 12, the fixing nut 121, and the position element 122 are all metals.

As mentioned above, in the lift device according to the preferred embodiment of the present invention, when the lift pin 11 is going to descend, the magnetic control device 130 generates a magnetic suction, namely the descending method of the lift pin 11 and the carrying base 12 is changed from a gravitational force to a traction force of the gravitational force and the magnetic force. Even if the lift pin 11 is slightly bent because of supporting quite a lot of weight, it can be ensured that the lift pin 11 and the carrying base 12 descend to an original position (as shown in FIG. 1, the lift pin 11 is at the original position), so that it can avoid a bad process (such as an uneven brightness problem of a display, causing a trace phenomenon) or a break happening.

For better implementing the lift device according to the preferred embodiment of the present invention, the preferred embodiment of the present invention is further provided with a system with the lift devices, wherein the meanings of the terms of the system are the same as they are in the lift device, and the implementing details can refer to the description of the preferred embodiment of the lift device.

Figure 2:
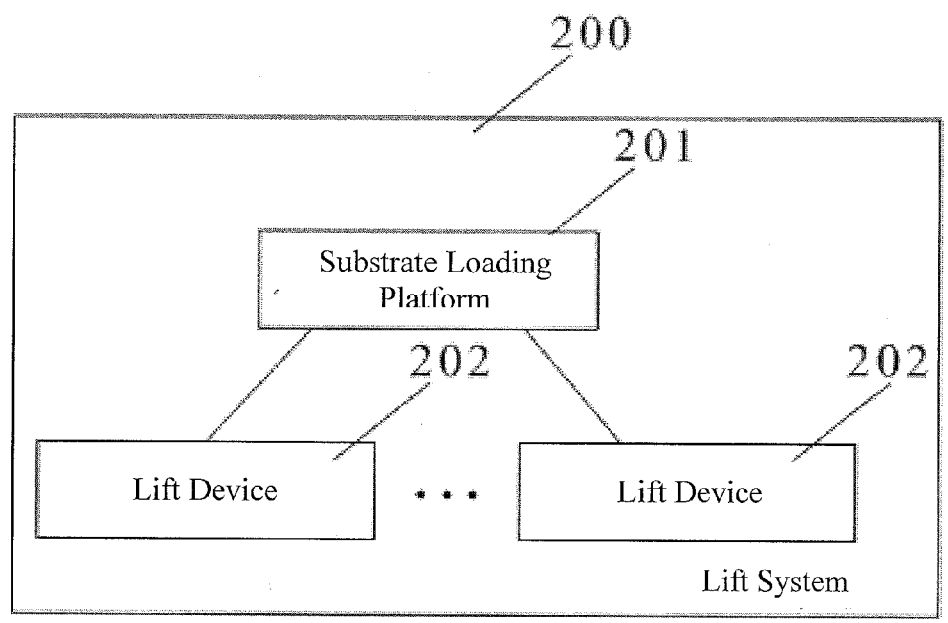
FIG. 2 is a structural schematic view of a lift system according to a preferred embodiment of the present invention.

Refer now to FIG. 2, which is a structural schematic view of a lift system 200 according to a preferred embodiment of the present invention. The lift system 200 comprises a substrate loading platform 201 and at least one lift device 202, wherein the substrate loading platform 201 is used to support a glass substrate, and the lift device 202 is fixed below the substrate loading platform 201. The lift device 202 is adopted the lift device of the above-mentioned embodiment, referring to FIG. 1 at the same time. The lift device 202 comprises:

a carrying mechanism 10, which includes a guiding hole 101;

a lift pin 11, which passes through inside the guiding hole 101;

a carrying base 12, which is connected and fixed to a lower end of the lift pin 11, wherein when the carrying base 12 is moved upward under an external force, the lift pin 11 is moved upward and inside the guiding hole 101; and a magnetic control device 13 which is connected to the carrying base 12 through a magnetic force line, wherein the magnetic control device 13 is used to send a magnetic control signal to the carrying base 12 through the magnetic force line, so as to move the lift pin 11 downward and inside the guiding hole 101 under the control of the magnetic control signal.

However, as shown in FIG. 1, the upper half of the lift pin 11 is thinner than the lower half thereof. When the lift pin 11 supports a glass substrate, the lift pin 11 is slightly bent because of supporting quite a lot of weight, so that the lower half of the lift pin 11 is rubbed against the inside of the guiding hole 101 when moving upward/downward and inside the guiding hole 101.

In the present invention, by the carrying base 12 being connected to the magnetic control device 13 and the magnetic control device 13 sending a magnetic control signal to the carrying base 12, the lift pin 11 is moved downward and inside the guiding hole 101 under the control of the magnetic control signal. That is, the descending method of the lift pin 11 and the carrying base 12 is changed from a gravitational force to a traction force of the gravitational force and the magnetic force. When the lift pin 11 is going to ascend, the magnetic control signal is not sent, and the lift pin 11 is moved upward by the external force applied to the carrying base 12; and when the lift pin 11 is going to descend, by a drive of the magnetic control signal, the magnetic force sucks the carrying base 12, and drives the lift pin 11 moved downward. The magnetic control signal of the magnetic control device 13 can be controlled to be generated and sent by software, they are not described here.

Additionally, the carrying mechanism 10 is provided with a support element 102, which is arranged on a periphery of the guiding hole 101, wherein the support element 102 is used to fix the carrying mechanism 10 below a substrate loading platform 100. The substrate loading platform 100 is used to support a glass substrate (not shown in the figure).

It can be understood that the substrate loading platform 100 is provided with a plurality of through holes, wherein each of the through holes is corresponding to a guiding holes 101 of a carrying mechanism 10 below the substrate loading platform 100. Since the glass substrate is loaded on the substrate loading platform 100, when a plurality of the lift pins 11 are simultaneously ascended or descended, and pass through the through holes, the glass substrate thereabove is driven to be ascended or descended.

Furthermore, as shown in FIG. 1, the carrying base 12 includes a fixing nut 121, and the lower end of the lift pins 11 is formed as a bolt. That is, the carrying base 12 and he lift pins 11 are fixed by a matching method of screw nut/bolt.

Preferably, the fixing nut 121 has a position element 122, which is arranged on a periphery of the fixing nut 121 to limit a maximum ascending movement distance of the lift pin 11. Preferably, in the preferred embodiment of the present invention, the materials of the carrying base 12, the fixing nut 121, and the position element 122 are all metals.

As mentioned above, the lift system 200 according to the preferred embodiment of the present invention comprises a plurality of lift devices. When the lift pin 11 is going to descend, the magnetic control device 130 generates a magnetic suction, namely the descending method of the lift pin 11 and the carrying base 12 is changed from a gravitational force of physics to a traction force of the gravitational force and the magnetic force. Even if the lift pin 11 is slightly bent because of supporting quite a lot of weight, it can be ensure that the lift pin 11 and the carrying base 12 are descended to an original position (as shown in FIG. 1, the lift pin 11 is at the original position), so that it can avoid a bad process (such as an uneven brightness problem of a display, causing a trace phenomenon) or a break happening.

In the above embodiments, the description of the various embodiments has focused on a certain embodiment which is not described in detail in a section, you can see the relevant description in other embodiments, which are not mentioned here.

Those skilled in the art will recognize that, with reference to the words used herein, "preferably" means serving as an example, a sample, or an illustration. Text described as "preferred" in any aspect or design is not necessarily to be construed as advantageous over other aspects or designs. In contrast, the term "preferred" is meant in the particular the way the concept. As used herein, the term "or" is intended to mean the inclusive "or" not the exclusive "or." That is, unless specified otherwise, or clear from the context, "X employs 101 or 102" means an arrangement of any nature, inclusive. That is, if X employs 101; X employs 102; or X employs both 101 and 102, then "X employs 101 or 102" is met in any of the foregoing examples.

Moreover, despite being relative to one or more implementations shown and described the present disclosure, equivalent variations and modifications will occur to those skilled in the art based on the present specification and drawings upon reading the present disclosure. The present disclosure includes all such modifications and variations, and is only limited by the scope of the appended claims. Particularly, with regard to the various functions performed by the above-described components (e.g., elements, resources, etc.), the terms used to describe such components are intended to perform the function corresponding to the specified component (e.g., functionally equivalent) of any of the components (unless otherwise indicated), even if the structure of the implementation and execution of the function of the present disclosure shown herein disclosed is not structurally equivalent. Additionally, although a particular feature of the present disclosure has been made with respect to certain implementations, only one is disclosed, but this feature may be as given or particular application and the purpose of enabling a desired one or more other implementations Other combinations of features. Moreover, the terms "comprising,", "having,", "containing," or variants thereof are used in the detailed description or the claims, such terms are intended to be used in a manner similar to the term "comprising"

Although the present invention has been disclosed in the preferred embodiments described above, the foregoing preferred embodiments are not intended to limit the present invention. One of ordinary skill in the art, without departing from the spirit and scope of the present invention within, may implement various modifications and variations, so the scope of the protection of the invention as defined in the claims will prevail.

The invention claimed is:

1. A lift device for a substrate loading platform, comprising:
   a carrying mechanism including a guiding hole;
   a lift pin passing through inside the guiding hole;
   a carrying base, wherein the carrying base including a fixing nut, and a lower end of the lift pin is formed as a bolt; and the carrying base is connected and fixed to the lower end of the lift pin, wherein when the carrying base is moved upward under an external force, the lift pin is moved upward and inside the guiding hole; and
   a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal;
   wherein the carrying mechanism further includes a support element, which is arranged on a periphery of the guiding hole, wherein the support element is used to fix the carrying mechanism below the substrate loading platform, and the substrate loading platform is used to support a glass substrate.

2. The lift device according to claim 1, wherein the fixing nut has a position element which is arranged on a periphery of the fixing nut to limit a maximum ascending movement distance of the lift pin.

3. The lift device according to claim 1, wherein the materials of the carrying base, the fixing nut, and the position element are all metals.

4. A lift device for a substrate loading platform, comprising:
   a carrying mechanism including a guiding hole;
   a lift pin passing through inside the guiding hole;
   a carrying base, wherein the caring base includes a fixing nut, and a lower end of the lift pin is formed as a bolt; and the carrying base is connected and fixed to the lower end of the lift pin, wherein when the carrying base is moved upward under an external force, the lift pin is moved upward and inside the guiding hole; and
   a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal.

5. The lift device according to claim 4, wherein the carrying mechanism further includes a support element, which is arranged on a periphery of the guiding hole, wherein the support element is used to fix the carrying mechanism below the substrate loading platform, and the substrate loading platform is used to support a glass substrate.

6. The lift device according to claim 4, wherein the fixing nut has a position element, which is arranged on a periphery of the fixing nut to limit a maximum ascending movement distance of the lift pin.

7. The lift device according to claim 4, wherein the materials of the carrying base, the fixing nut, and the position element are all metals.

8. A lift system for a substrate loading platform, comprising: the substrate loading platform and at least one lift device;
   wherein the substrate loading platform is used to support a glass substrate;
   the lift device is fixed below the substrate loading platform; and
   wherein the lift device comprises:
   a carrying mechanism including a guiding hole;
   a lift pin passing through inside the guiding hole;
   a carrying base, wherein the carrying base includes a fixing nut, and a lower end of the lift pin is formed as a bolt; and the carrying base is connected and fixed to the lower end of the lift pin, wherein when the carrying base is moved upward under an external force, the lift pin is moved upward and inside the guiding hole; and
   a magnetic control device connected to the carrying base through a magnetic force line, wherein the magnetic control device is used to send a magnetic control signal to the carrying base through the magnetic force line, so as to move the lift pin downward and inside the guiding hole under the control of the magnetic control signal.

9. The lift system according to claim 8, wherein the carrying mechanism further includes a support element, which is arranged on a periphery of the guiding hole, wherein the support element is used to fix the carrying mechanism below the substrate loading platform, and the substrate loading platform is used to support a glass substrate.

10. The lift system according to claim 8, wherein the fixing nut has a position element which is arranged on a periphery of the fixing nut to limit a maximum ascending movement distance of the lift pin.

11. The lift system according to claim 8, wherein the materials of the carrying base, the fixing nut, and the position element are all metals.

* * * * *